(12) United States Patent
Chakraborty et al.

(10) Patent No.: US 10,061,833 B2
(45) Date of Patent: Aug. 28, 2018

(54) DATA INSIGHT AND INTUITION SYSTEM FOR TANK STORAGE

(71) Applicants: Rabindra Chakraborty, John Creek, GA (US); Jay Kalra, San Jose, CA (US); Anupam Awasthi, Saratoga, CA (US); Amol Awasthi, Dubai (AE)

(72) Inventors: Rabindra Chakraborty, John Creek, GA (US); Jay Kalra, San Jose, CA (US); Anupam Awasthi, Saratoga, CA (US); Amol Awasthi, Dubai (AE)

(73) Assignee: SENSLYTICS CORPORATION, San Jose, CA (US)

( * ) Notice: Subject to any disclaimer, the term of this patent is extended or adjusted under 35 U.S.C. 154(b) by 949 days.

(21) Appl. No.: 14/497,105

(22) Filed: Sep. 25, 2014

(65) Prior Publication Data
US 2016/0092501 A1 Mar. 31, 2016

(51) Int. Cl.
*G06F 7/00* (2006.01)
*G06F 17/00* (2006.01)
*G06F 17/30* (2006.01)

(52) U.S. Cl.
CPC .............. *G06F 17/30592* (2013.01)

(58) Field of Classification Search
CPC .................. G06F 17/30389; G06N 5/04
USPC .......................................... 707/600
See application file for complete search history.

(56) References Cited

U.S. PATENT DOCUMENTS

| | | | | |
|---|---|---|---|---|
| 9,207,970 | B1* | 12/2015 | Antanies | G05B 23/0267 |
| 2008/0300919 | A1* | 12/2008 | Charlton | G06Q 50/22 |
| | | | | 705/2 |
| 2009/0037424 | A1* | 2/2009 | Susairaj | H04L 67/1097 |
| 2009/0089233 | A1* | 4/2009 | Gach | G05B 19/4185 |
| | | | | 706/45 |
| 2010/0023457 | A1* | 1/2010 | Riviere | G06Q 40/04 |
| | | | | 705/36 R |
| 2010/0125662 | A1* | 5/2010 | Ou | G06F 21/554 |
| | | | | 709/224 |
| 2011/0016058 | A1* | 1/2011 | Pinchuk | G06Q 10/067 |
| | | | | 705/348 |
| 2011/0077958 | A1* | 3/2011 | Breitenstein | G06Q 10/10 |
| | | | | 705/2 |
| 2013/0073096 | A1* | 3/2013 | Brey | G05B 13/02 |
| | | | | 700/282 |

(Continued)

*Primary Examiner* — Binh V Ho
(74) *Attorney, Agent, or Firm* — Womble Bond Dickinson (US) LLP

(57) ABSTRACT

Systems are disclosed herein for improving analytic processing and processing for handling severe outliers in a dataset that cause predictive analytic processing to fail. In one embodiment, the system comprises one or more processors, a memory communicatively coupled to the one or more processors and to store logic, the logic, upon being executed by the one or more processors, transmits instructions to filter data for only a specified one or more variables, receives a first set of specified variables corresponding to a first external database, upon receiving the first set of specified variables, accessing a second set of specified variables corresponding to a second external database, accessing a third set of specified variables corresponding to a third external database, and performing predictive analytic processing using the first set of specified variables, the second set of specified variables and the third set of specified variables to generate a first insight.

20 Claims, 10 Drawing Sheets

(56) References Cited

U.S. PATENT DOCUMENTS

| | | | | |
|---|---|---|---|---|
| 2013/0212422 A1* | 8/2013 | Bauer | ............... | H04L 67/1097 |
| | | | | 714/4.1 |
| 2013/0311968 A1* | 11/2013 | Sharma | ............... | G06Q 10/06 |
| | | | | 717/101 |
| 2014/0351589 A1* | 11/2014 | Chenna | ............... | H04L 63/0823 |
| | | | | 713/168 |
| 2015/0113614 A1* | 4/2015 | Sarkuni | ............... | H04L 63/08 |
| | | | | 726/5 |
| 2015/0161633 A1* | 6/2015 | Adams | ............... | G06Q 30/0204 |
| | | | | 705/7.33 |

* cited by examiner

DATA INSIGHT AND INTUITION SYSTEM FOR TANK STORAGE

FIELD OF THE INVENTION

The present invention relates to the field of predictive analytics, event tracking and processing of data points that are severe outliers from a dataset. In particular, specific embodiments of the disclosure relate to the aggregation of large collections of data, performing processing on the aggregation and generating an improved predictive analytic analysis. Other embodiments relate to the processing of outliers from the dataset.

BACKGROUND OF THE INVENTION

Today, we are more connected as a society than ever before. Data is continuously being mined and stored from various sources by a plethora of companies and individuals. Data may be, among others, data from any type of sensor, data tracked by companies or data relevant to the public at large. Examples of data affecting the public at large may be traffic data, weather data, stock price data, etc.

Companies often use sensors to track the condition of their equipment and inventory. For example, sensors are used in oil depots ("tank farms") to monitor various statistics of the oil stored at the tank farms as well as conditions of the equipment storing the oil. Sensors may be used to track the amount of oil stored in each storage tank, the water density in each tank, the inflow into each storage tank, the outflow of oil from each tank, etc. In addition, sensors may be used to track the temperature of the interior of the tank, the exterior or the humidity surrounding the tank.

In addition, companies track their inventory and sales at their distribution centers. For example, an oil distribution company will track the amount of oil it sells to each gas station, airport, shipping yard, etc. The company likely tracks the price at which each barrel of oil was sold, the date of the sale, etc. The company may also track its supply chain and distribution processes such that the time and steps taken to refine the oil as well as the location of each transport vessel (e.g., ship or truck).

Furthermore, some forms of gathered types have been used to predict future events. For example, weather data, e.g., data relevant to the public at large, is routinely collected and used to predict future weather systems in a given geographic area. For example, data may be collected from thermometers, barometers, windsocks, humidity sensors, air pressure sensors, etc.

However, even though all of this data may be collected and stored by various sources, the use of such data in predictive analytics has thus far been limited. For example, the data used to predict the weather forecast (e.g., data relevant to the public at large) has not been combined with data collected by companies regarding their inventory and shipments (e.g., business applications data such as the enterprise resource planning (ERP) of the company).

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1A:
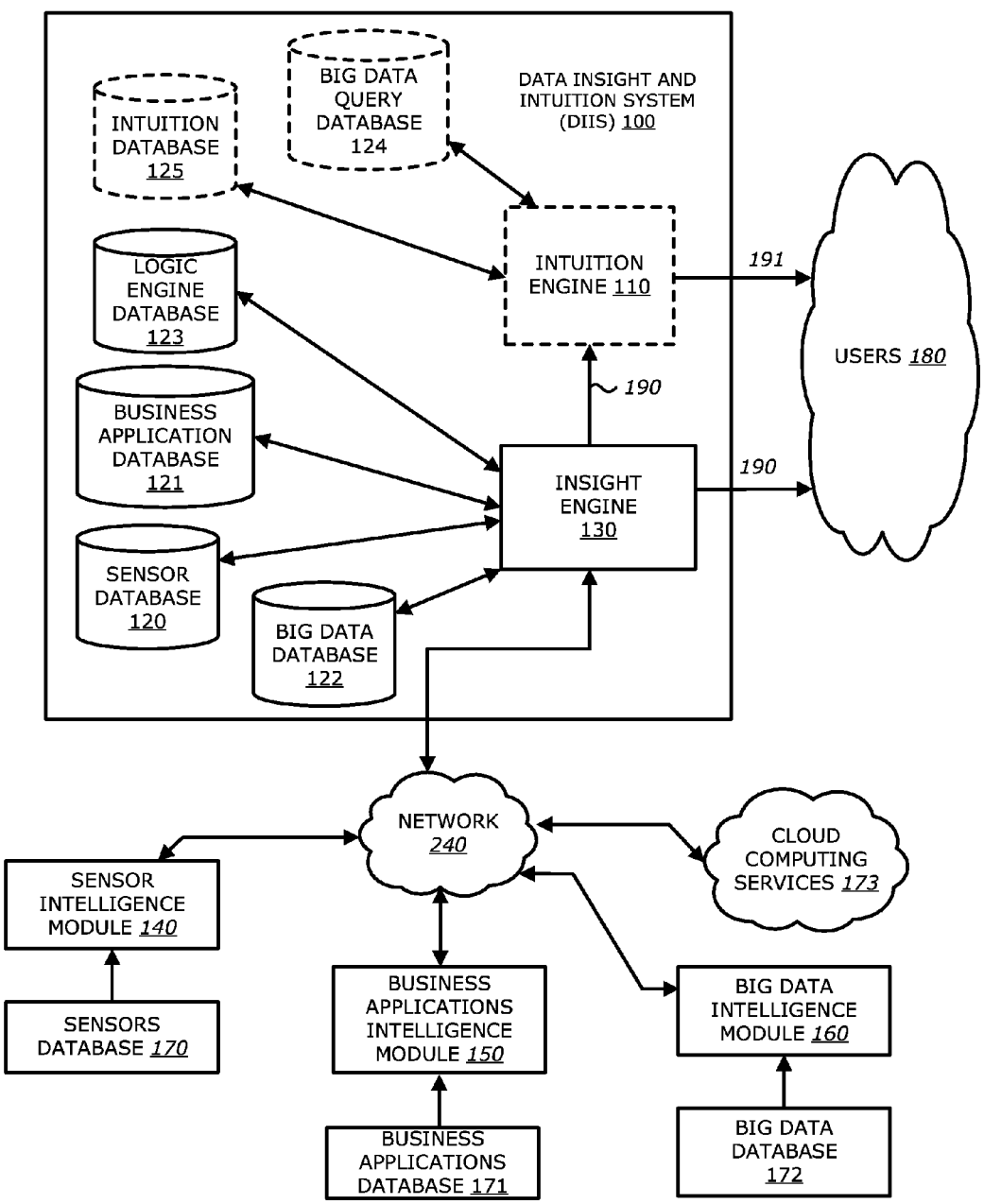
FIG. 1A is a block diagram of an exemplary data insight and intuition system (DIIS) coupled to a network.

Methods and apparatuses are disclosed herein for implementing an improved insight and intuition generation process through the use of aggregating multiple data sources for use with predictive analytics and predictive modeling. One goal of embodiments of the present invention is, using an aggregation of collected data, obtaining improved, reliable and accurate insights, forecasts and recommendations for taking current action regarding, among others, commercial decisions. Using the insights and/or intuition outputs of the data insight and intuition system (DIIS), a course of action pertaining to a business or personal decision may be recommended. The discussion herein uses the oil and gas industry as a primary example. However, the ideas and inventive aspects portrayed in the examples may be applied to other industries (e.g., nuclear energy plants, recycling plants, etc.), commercial ventures or personal motives.

As mentioned above, a tank farm, also described as an oil depot, is an oil reserve comprising a plurality of oil storage tanks and distribution facilities. An automatic tank gauging (ATG) system may be used in tank farms for monitoring, among others, the oil level in each tank, inflow-outflow of oil in each tank and/or the rate of flow at the time of receiving oil and/or gas (e.g., a purchasing transaction) into the tank and releasing oil and/or (e.g., a selling transaction) from the tank. Sensors configured with various technologies are used for these measurements and to collect other data helpful in the management of the tanks. In one embodiment, multiple sensor gauges such as radar sensors, ultrasound sensors and/or servo-gauges may be used to collect the amount of oil in a tank. Today, the data collected by sensors at tank farms are stored in large databases and used to monitor the inventory stored at each tank farm as well as to monitor the condition of the equipment (e.g., allows for the determination one or more tanks are overheating).

Currently, the business applications data (e.g., enterprise resource planning data) collected by oil companies is not utilized in conjunction with the data collected by an ATG system in predictive analytics. In addition, the data relevant to the public at large ("big data") such as, among others, weather data, traffic data, airline data and/or data regarding social events (e.g., academic conferences, holiday festival gatherings—Mardi Gras festivals in New Orleans for instance, the Super Bowl, etc.) has not been used in conjunction with sensor data and/or business applications data in predictive analytics.

Therefore, one embodiment of the disclosure provides an improved method for utilizing sensor data, business applications data and big data in predictive analytics and predictive modeling. The predictive analytic and predictive modeling may provide users with an "insight." An insight includes the results of data processing involving the predictive analytics and predictive modeling ("predictive analytic processing") that utilize the combination of data from various sensors databases, business applications databases and big data databases. The insight provides a prediction of a future resolution of a predefined inquiry based on the predictive analytic processing.

In addition to an insight, the DIIS may generate an "intuition" based on the insight 190 and the tracking of one or more events related to the insight 190. The method of generating an intuition includes (i) determining that an insight will breakdown by failing to provide useful information due to a disruptive event that does not lend itself to predictive analytics and (ii) analyzing alternative options for realizing the interest behind insight (e.g., the interest behind the predefined inquiry provided to the insight engine).

As one example, a user may provide a DIIS with an insight inquiry seeking to determine how much oil and/or gas should be stored near New York City and Long Island on a daily basis. The interest behind the insight inquiry may be to ensure performance on the contracts the user has with gas stations within a 50 mile radius of New York City and Long Island wherein the contracts require a certain amount of oil and gas delivered each day.

In one embodiment of the disclosure, the DIIS may utilization the combination of data from various sources (e.g., weather and population data, the inventory stored within a 50 mile radius of New York City and Long Island, the available trucks for transporting oil and gas, typical usage on a daily basis, the amount of oil stored at each tank farm and inflow and outflow levels of each oil and/or gas tank) to improve predictive analytic processing.

In another embodiment of the disclosure, the DIIS may reject the results of the predictive processing based on the occurrence of a disruptive event that does not fit within the constraints of the predictive analytics and/or the predictive modeling. For example, Hurricane Sandy recently destroyed much of Long Island and greatly affect the traffic and power grid of New York City and Long Island. In such a situation, the DIIS may analyze alternative options to satisfy the interest behind the insight inquiry. The analysis may include analyzing tracking and modeling of predefined events that impact the interest behind the insight inquiry (e.g., alternative traffic routes to avoid flooded roads, alternative delivery times to avoid traffic, alternative distribution facilities that may supply extra oil and/or gas, etc.).

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

I. TERMINOLOGY

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The term "big data" should be interpreted as data that affects the general public and should be not interpreted as relating to solely an amount of data. For example, weather data should be interpreted as big data as weather data affects the general public. Examples of weather data include, but are not limited or restricted to, temperature data (e.g., current and projected), rainfall data, humidity data, ultraviolet (UV) index data, wind data, etc.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

I. INSIGHT AND INTUITION GENERATION

Techniques for insight, cognition output and intuition generation are described. It is to be understood that the following example(s) is (are) for the purpose of explanation and not limitation. The proposed techniques will be explained in more detail further below with reference to drawings and diagrams.

Referring to FIG. 1A, a block diagram of an exemplary data insight and intuition system (DIIS) coupled to a network is shown. The network 240 provides communication connectivity between the DIIS 100 and one or more intelligence modules and through the intelligence modules, various databases communicatively connected to the intelligence modules. In FIG. 1A, the one or more intelligence modules, for illustrative purposes, include the sensor intelligence module 140, the business applications intelligence module 150 and the big data intelligence module 160. The databases communicatively connected to the sensor intelligence module 140, the business applications intelligence module 150 and the big data intelligence module 160 include the sensor database 170, the business applications database 171 and the big data database 172 respectively. In other embodiments, additional or alternative intelligence modules may be connected to the network 240 wherein the additional or alternative intelligence modules are communicatively connected to related databases. In addition, the DIIS 100 may be communicatively coupled to the cloud computing services 173 which may provide additional or alternative storage and/or processing hardware.

The DIIS 100 as illustrated in FIG. 1A may be an electronic network device specially configured for the generation of insights, cognition outputs and/or intuitions. Alternatively, the DIIS 100 may be software, hardware or firmware acting in coordination with a general purpose electronic device. In yet another embodiment, the DIIS 100 may be contained with an individual processor, an embedded microcontroller, a microchip, or the like. In addition, although illustrated as a complete system, the DIIS 100 may be comprised of various components such that the intuition engine 110 and the insight 130 are located, for example, within the same general purpose electronic device on separate microcontrollers or, alternatively, for example, on the same microcontroller. In addition, the databases included in the DIIS 100 (the sensor database 122, the business application 123, the logic engine database 125, the optional intuition database 121 and the optional big data query database 120) may similarly be located within the same general purpose electronic device, on a peripheral device or within a cloud storage.

As shown in FIG. 1A, the DIIS 100 is an electronic network device that is adapted to analyze information associated with a plurality of data observed by one or more sensors or stored in one or more databases (e.g., the sensor database 170, the business applications database 171 and the big data database 172). The DIIS 200 receives the observed and stored data over the network 240. The network 240 may include a public network such as the Internet, a private network such as a wireless data telecommunication network, wide area network, a type of local area network (LAN), or a combination of networks.

The databases communicatively coupled to the intelligence modules store particularized data. The sensor database 170 stores data observed by one or more sensors. For example, an oil depot (a "tank farm") may be an industrial facility comprised of several tanks configured for the storage of oil and/or petrochemical products. Within or connected to the tanks, several sensors gather raw data relating to various particulars of the tank. Examples of such particulars include, but are not limited or restricted to, oil level, inflow of oil, outflow of oil, water density in the tank, the air pressure within the tank and/or the temperature inside and/or surrounding the tank.

The business applications database 171 stores data collected by enterprise databases relating to commercial management and business strategizing (the Enterprise Resource Planning, "ERP," of a corporation). For example, the data collected by enterprise databases of an oil supply corporation may include, but are not limited or restricted to, the sales figures for each distribution center across nationally (or globally), the number of transportation vessels currently transporting product to one or more distribution centers, the number of transportation vessels currently idle, the schedule of the amount of product to be delivered to each distribution center, etc. The big data database 172 stores big data affecting the general public. Examples of big data include, but are not limited or restricted to, weather data, airline data (e.g., delays, routes), traffic data, stock prices, etc. In addition, the data stored in the databases 170-172 may be derived from public and/or private data depending on acquired authorization.

As illustrated in FIG. 1A, the DIIS 100 includes the insight engine 130, the sensor database 120, the business application database 121, the big data database 122, the logic engine database 123, the optional intuition engine, the optional intuition database 125 and the optional big data query database 124. The insight engine 130 is communicatively connected to the network 240 (e.g., through a communication interface) and also communicatively coupled to the sensor database 120, the business application database 121, the big data database 122, the logic engine database 123 and the optional intuition engine 110. If present, the intuition engine 110 is communicatively coupled to the insight engine 130, the optional intuition database 125 and the optional big data query database 124. Both the insight engine and the optional intuition engine may provide output (insight 190 and intuition output 191, respectively) to the users 180.

Figure 1B:
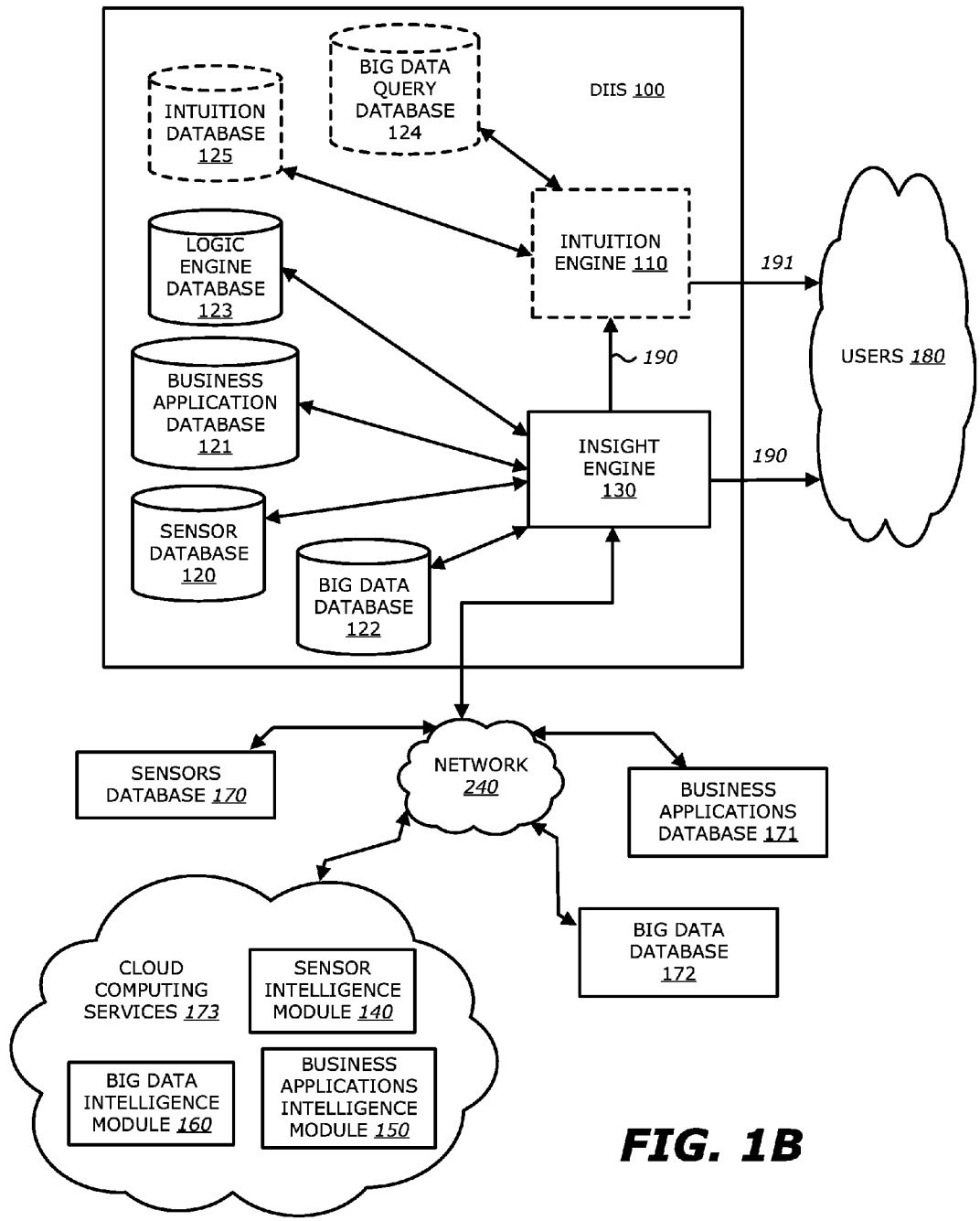
FIG. 1B is a second block diagram of an exemplary data insight and intuition system (DIIS) coupled to a network.

Referring to FIG. 1B, a second block diagram of an exemplary DIIS 100 coupled to a network 240 is shown. FIG. 1B illustrates the embodiment in which the intelligence modules (the sensor intelligence module 140, the business applications intelligence module 150 and the big data intelligence module 160) are located within the cloud computing services 173. In such an embodiment, each intelligence module obtains the appropriate data from one of the databases 170-172 via the network 240 using the appropriate APIs.

1. INTELLIGENCE MODULES

Figure 2:
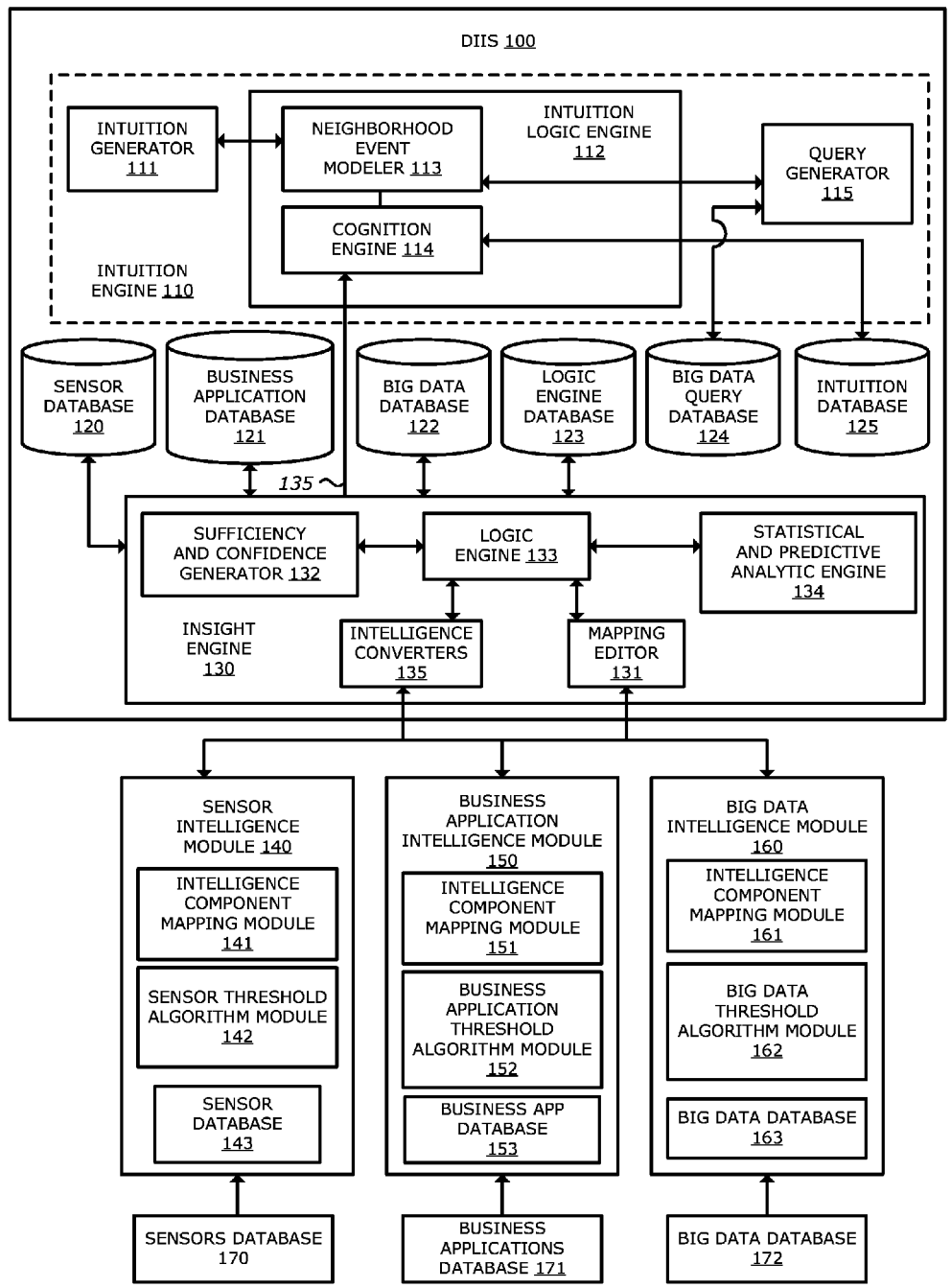
FIG. 2 is a third block diagram of an exemplary DIIS coupled to a network.

Referring to FIG. 2, a third block diagram of an exemplary DIIS 100 coupled to a network 240 is shown. The intelligence modules (the sensor intelligence module 140, the business applications intelligence module 150 and the big data intelligence module 160) communicate with the databases 170-172 via applicable application programming interfaces (APIs). Each intelligence module performs the same activities on the data received from the database to which each is connected; therefore, only the sensor intelligence module 140 will be discussed in detail.

The sensor intelligence module 140 includes an intelligence component mapping module 141, a sensor threshold algorithm module 142 and a sensor database 143. The sensor threshold algorithm module 142 determines whether a significant change (e.g., a predetermined change) in the raw data received from the sensors database 170 has exists since the most recent transmission of data from the sensor intelligence module 140 to the DIIS 100. The sensor database 143 stores the most recent data that was transmitted to the DIIS 100. The intelligence component mapping module 141 receives the instructions from the mapping editor regarding the required variables to be transmitted to the DIIS 100 that are derived from the data stored in the sensors database 170. The intelligence component mapping module 141 filters all of the raw data stored in the sensors database 170 when the sensor threshold algorithm 142 signals that a significant change exists between the data currently stored in the sensors database 170 and the most-recently transmitted data. The intelligence component mapping module 141 will be configured, and possibly reconfigured, via the instructions of the mapping editor 131 so that it transmits only the required variables when a significant change exists. In addition, the sensor threshold algorithm module 142 has knowledge of the required variables to be transmitted to the DIIS 100 so that it determines whether a significant change exists based on the required variables.

In addition to the abilities described above, the intelligence component mapping modules may query the databases to which they are communicatively connected. For example, the intelligence component mapping module 151 included in the business applications intelligence module 150 may query the business applications database 171 to generate specific data. In one embodiment, the business applications database 171 may store data regarding the amount of oil stored in each storage tank across the United States. However, if a desired insight and/or intuition merely requires knowledge of the amount of oil stored within a predetermined geographic radius of, for example, Tuscaloosa, Ala., the intelligence component mapping module 151 may query the business applications database 171 for the amount of oil stored in the storage tanks within the predetermined geographic radius.

FIG. 2 illustrates that the insight engine 130 includes a logic engine 133 communicatively coupled to a mapping editor 131, a sufficiency and confidence generator 132, a statistical and predictive analytic engine 134 and intelligence converters 135. The mapping editor 131 and the intelligence converters 135 are communicatively coupled to the intelligence modules via the network 240 (as illustrated in FIGS. 1A and 1B). The mapping editor 131 is used to configure the DIIS 100 and the intelligence modules. The mapping editor is initially configured with the pieces of data ("specified variables") needed from each intelligence module to form the desired intuition. Therefore, upon the initial configuration, the mapping editor 131 transmits instructions to each of the intelligence modules describing the specified variables used to generate the insight.

For example, a desired insight and/or intuition may be that the user (e.g., a corporation) wants to know how much to charge for gasoline each day. Relative to the sensors database 170, for such an insight, the temperature in the geographic vicinity of the tank storing oil and/or gas and the air pressure inside the tank may not be relevant and thus, not used in the generation of the insight. In contrast, the amount of oil, the inflow and outflow of oil and the water density in each tank may be required to determine the amount of oil reserves the corporation has available. Therefore, the mapping editor 131 would be configured to instruct the sensor intelligence module 140 to transmit only data pertaining to the amount of oil, the inflow and outflow of oil and the water density in each tank. Once the sensor threshold algorithm module 142 determines that a significant change exists between the most-recently transmitted raw data and the received raw data, the intelligence component mapping module 141 transmits the required variables to the appropriate intelligence converter of the intelligence converters 135.

The sensor threshold algorithm mapping module 142 determines whether a significant change exists based on an evaluation of several factors. The factors taken into consideration are specific to the required variables. For example, if the variable pertaining to the amount of oil in each tank is required, the sensor threshold algorithm mapping module 142 may compare the most recently transmitted amount of oil in each tank with the most recently received amount of oil in each tank. If, for example, the amount in one or more tanks has changed a predetermined amount (e.g., 10%) than the sensor threshold algorithm mapping module 142 determines a significant change exists. The factors that are considered are included in the initial configuration via the mapping editor 131. One purpose of the threshold algorithms present in each of the intelligence modules (e.g., the sensor threshold algorithm 142 included in the sensor intelligence module 140) is to prevent excess and unnecessary data from being transmitted to the DIIS 100. The rate and frequency at which data is gathered and stored in the databases 170-172 may be extremely high (e.g., at intervals of milliseconds). Therefore, it is necessary to filter the gathered raw data to ensure that only raw data having a significant change from the previous transmission to the DIIS 100 is transmitted. Otherwise, the DIIS 100, in particular the insight engine 130, may be overwhelmed with the amount of received raw data that it will be unable to generate useful insights.

The initial configuration of the DIIS 100 will instruct the sensor threshold algorithm mapping module 142 which factors to consider and how to determine whether a significant change exists with each figure (e.g., percentage of change necessary for each factor). The configuring may be provided through one or more templates for one or more desired insights and/or intuitions. For example, a template of required variables to form an intuition regarding the change in price of a product may be generated prior to configuration and loaded into the mapping editor 131. The mapping editor 131 may then use the template to instruct the intelligence modules which variables are required.

As an example using another intelligence module, the big data intelligence module 160 may be instructed to transmit, among others, the variable pertaining to the expected time to drive from Newark, N.J. to Queens, N.Y. The big data threshold algorithm may consider the change in the percentage of expected time to drive from Newark to Queens. When the change in percentage exceeds a predetermined threshold, the big data threshold algorithm module 162 signals to the intelligence component mapping module 161 that a significant change exists and the required data needs to be transmitted to the insight engine 130. In one embodiment, a significant change may exist when one variable is determined to have significantly changed. Alternatively, multiple variables may have to have significantly change prior to signaling to the applicable intelligence component mapping module that the recently received raw data needs to be transmitted to the insight engine 130.

Figure 3:
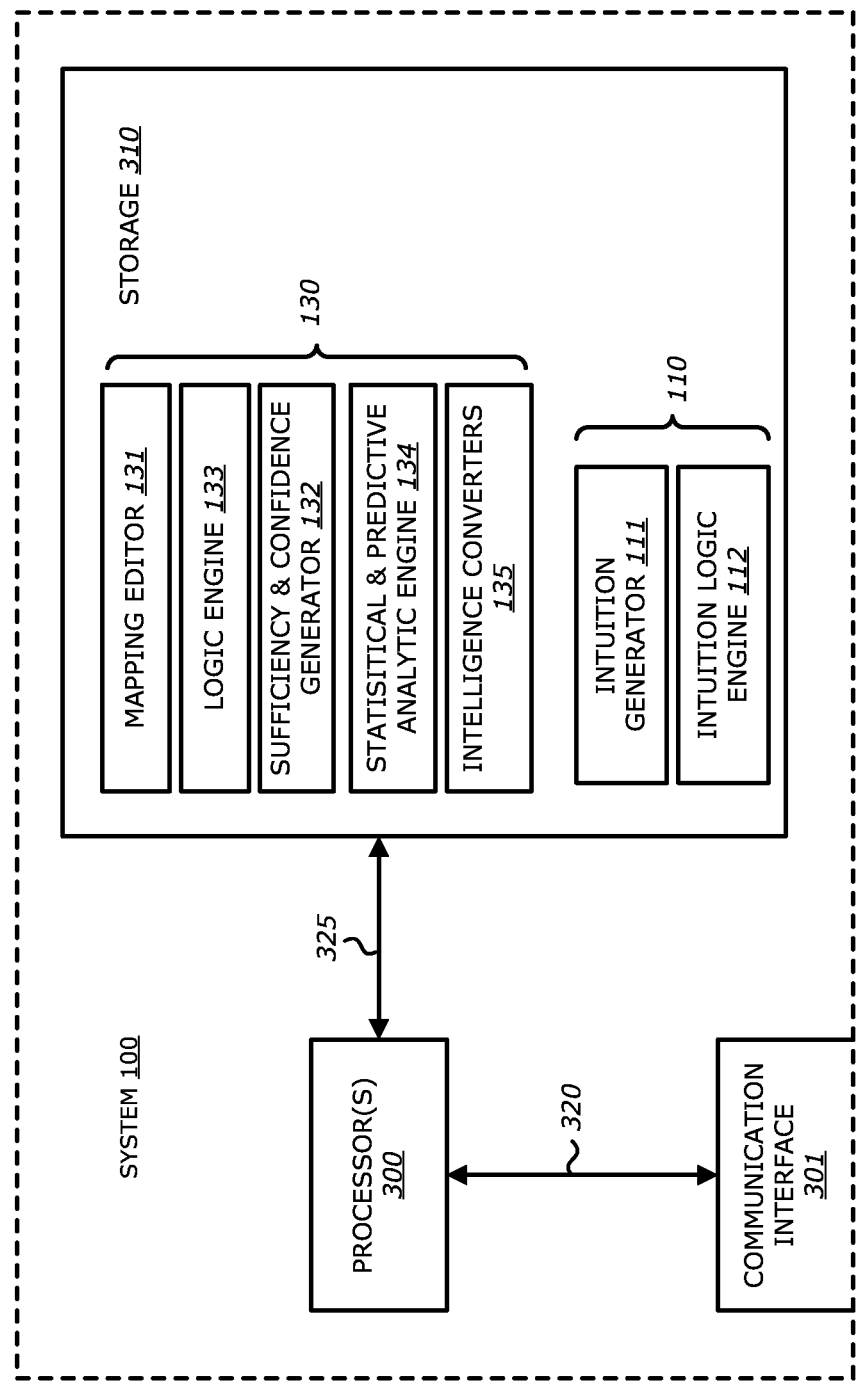
FIG. 3 is an exemplary embodiment of a logical representation of the DIIS.

In addition, the mapping editor 131 may be reconfigured and in turn, reconfigure the intelligence modules as well as the insight engine 130 and the intuition engine 112. For example, the desired insight may change over the course of time with the new insight requiring different variables from the initial insight. Therefore, the new set of variables may be entered into the DIIS 100 through a communication interface (as illustrated in FIG. 3), for example over the network 240 or directly by a network administer.

Furthermore, although the mapping editor 131 is illustrated in FIG. 2 as being included within the insight engine 130, alternative embodiments may exist such that the mapping editor is a stand-alone component (e.g., software module, firmware or hardware component) that is communicatively coupled to the insight engine 130 and the intelligence modules.

2. DATA INSIGHT AND INTUITION ENGINE

A. INTUITION INSIGHT ENGINE

Figure 7:
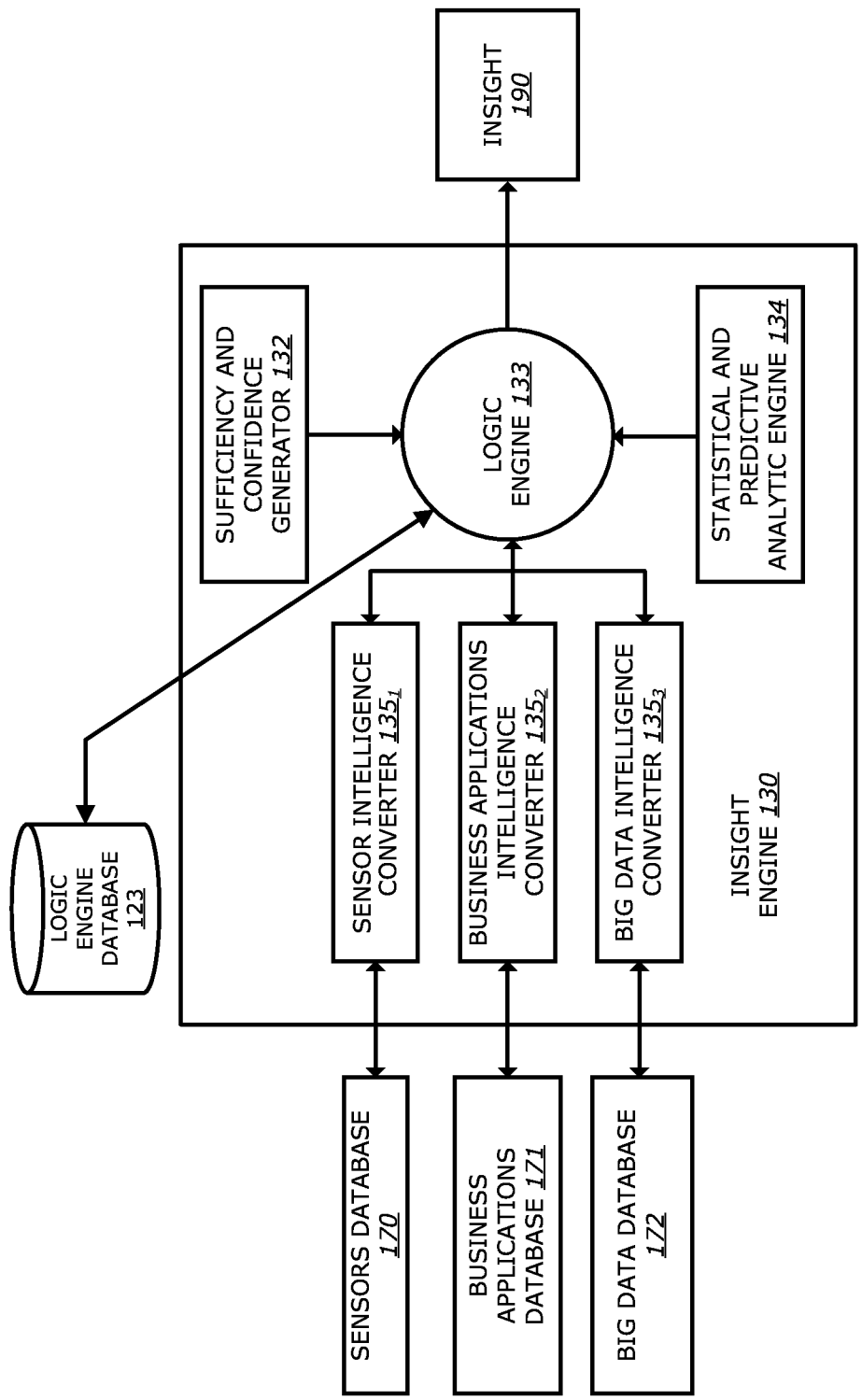
FIG. 7 is a block diagram of an exemplary insight engine.

The intelligence converters 135 comprise one or more intelligence converters corresponding to the intelligence modules. The intelligence converters 135 may comprise one or more intelligence converters. In one embodiment, a single intelligence converter handles all of the incoming raw data from the intelligence modules. Alternatively, there may be a one-to-one ratio of intelligence converters to intelligence modules. In the exemplary embodiment illustrated by FIG. 2, the intelligence converters 135 comprise the sensor intelligence converter $135_1$, the business applications intelligence converter $135_2$ and the big data intelligence converter $135_3$ (as illustrated in FIG. 7). The intelligence converters receive the incoming raw data from the intelligence modules (e.g., the specified variables used to generate the insight and/or intuition). The intelligence converters 135 may manipulate the received raw data and convert the received raw data into a form or format readable by the logic engine 133, the sufficiency and confidence generator 132 and/or the statistical and predictive analytic engine 134. The converted data may be described as an "intelligence." The intelligence comprises the one or more variables required to generate the insight and/or intuition. The logic engine 133 may receive an intelligence from each of the individual intelligence converters. For example, referring to FIG. 7, the logic engine 133 may receive a sensor intelligence from the sensor intelligence converter $135_1$, a business applications intelligence from the business applications intelligence converter $135_2$ and a big data intelligence from the big data intelligence converter $135_3$. After converting the raw data, the intelligence converters 135 transmit the converted data to the logic engine 133.

As is illustrated in FIG. 2, the insight engine 130 includes the statistical and predictive analytic engine 134 that is communicatively coupled to the logic engine 133. The logic engine 133 receives one or more intelligences from the intelligence converters (which may be stored in the logic engine database 123) and passes the intelligences to the statistical and predictive analytic engine 134. The statistical and predictive analytic engine 134 analyzes the intelligences and plots the intelligences as one or more data points. The data points may be fitting to a mathematical function that may assist in the analysis of the statistical and predictive analytic engine 134. For example, the intelligences may be fitted to a linear or nonlinear curve. The variables comprising the one or more intelligences may be fitted to a curve using an interpolation method or the fitting may be an approximate fitting. The statistical and predictive analytic engine 134 determines what the most logical progression of the variables comprising the intelligence will be in the future.

For example, the statistical and predictive analytic engine 134 may receive an intelligence including, among other variables, the amount of oil stored in a subset of storage tanks in a particular region. The statistical and predictive analytic engine 134 may be able to fit the received variables to a linear curve (e.g., using past received intelligences stored in the logic engine database 123) and predict that the amount of oil in the subset of storage tanks over the next 72 hours will increase at a rate of two percent per 24 hours. This prediction would be returned to the logic engine 133.

The statistical and predictive analytic engine 134 may comprise a plurality of algorithms, functions and/or equations such as any linear or nonlinear functions, quadratic equations, trigonometric functions (e.g., sine and cosine), polynomial equations or the like.

The logic engine 133 uses the input received from the statistical and predictive analytic engine 134 (e.g., a prediction) and the intelligences received from the intelligence converters 135 to generate an insight. One goal of the logic engine 133 converts the variables received by the intelligence converters 135 into a format that is understandable by a human and provides some prediction of a future resolution of a predefined insight inquiry. For example, as discussed above, the statistical and predictive analytic engine 134 may provide the logic engine 133 with input stating that, based on fitting the received intelligence and one or more past received intelligences to a linear curve, the amount of oil in the subset of storage tanks over the next 72 hours will increase at a rate of two percent per 24 hours in a quantitative, numerical or mathematical representation. The logic engine 133 will convert this into a form readable and understandable by a human.

Importantly, the logic engine 133 does not merely consider a single factor, variable, fitting of data to a single curve, or even a single intelligence. Instead, the logic engine 133 aggregates the intelligences provided by each of the intelligence converters 135 in forming an insight. The DIIS 100 receives variables from across a wide spectrum of sensors and/or databases and aggregates all of the variables to form an insight. Depending on the desired insight and/or intuition, the logic engine 133 may weight various variables and/or curve fittings differently. Such weightings may be initially configured as part of the overall configuration of the DIIS 100 and the intelligence modules (e.g., via the mapping editor), may be reconfigured over time or may evolve based on machine learning and heuristics. For example, the initial configuration of the DIIS 100 may instruct the logic engine 133 to weigh the intelligences received from the sensor intelligence converter $135_1$ more heavily than the intelligences received from the big data intelligence converter $135_3$. However, over time, the logic engine 133, through machine-learning techniques, may alter the weighting of the various intelligences due to, among other factors, variables from one intelligence routinely providing better fits to curves and/or more or less variation in the data (e.g., more or less outliers based on previously received intelligences). This machine learning process may take place over days, weeks, months and/or years as intelligences are collected.

For example, the logic engine 133 may give a first weight to the intelligence received from the sensor intelligence converter $135_1$, a second weight to the intelligence received from the business applications intelligence converter $135_2$, a third weight to the intelligence received from the big data intelligence converter $135_3$, a fourth weight to the input received from the statistical and predictive analytic engine 134 and a fifth weight to previously generated insights, wherein the weightings may be equal or different. In one exemplary illustration, the logic engine 133 may give equal weighting to the intelligences received from (i) the sensor intelligence converter $135_1$, (ii) the business applications intelligence converter $135_2$ and (ii) the big data intelligence converter $135_3$ and the input from the statistical and predictive analytic engine 134. As discussed above, the statistical and predictive analytic engine 134 may predict that the amount of oil in the subset of storage tanks over the next 72 hours will increase at a rate of two percent per 24 hours (e.g., the subset being tanks within a 100 mile radius of Tuscaloosa, Ala.). However, the one or more variables from the intelligence received from the big data intelligence converter $135_3$ may demonstrate an influx of people over the past two days near Tuscaloosa, Ala. (as a result of an event at the University of Alabama). In addition, one or more variables from the intelligence received from the business applications intelligence converter $135_2$ may illustrate an increase in the amount of gas sales at gas stations within a 100 mile radius of Tuscaloosa, Ala. Therefore, based on the intelligences received and the input from the statistical and predictive analytic engine 134, the logic engine 133 may generate an insight that states gas prices at gas stations within a 100 miles radius of Tuscaloosa, Ala. should be increased by five cents for the next three days to account for the influx of people into the area over that time span (the figure of five cents may be predefined during configuration).

The above example illustrates how the logic engine 133 generates an insight based on a combination of the variables received from the databases 170-172. By gathering and aggregating the data included in the sensors database 170, the business applications database 171 and the big data base 172, the logic engine 133 may take into account that there is an influx of people into the geographic area and that there is also an increase in the amount of gas being sold; therefore, generating an insight to increase the price of oil and observe a profit.

In the exemplary diagram of FIG. 2, the sufficiency and confidence generator 132 is included within the insight engine 130 and is communicatively coupled to the logic engine 133. The sufficiency and confidence generator 132 receives an insight as input from the logic engine 133. The sufficiency and confidence generator 132 also receives the variables used by the logic engine 133 to generate the insight. One purpose of the sufficiency and confidence generator 132 is to determine (i) the sufficiency of the variables used to generate the insight and (ii) the confidence of the prediction provided by the insight. The sufficiency of the variables is determined by analyzing, for example, the number of variables required for the insight and/or intuition by the configuration of the DIIS 100 (e.g., the initial configuration or a reconfiguration process). For example, the configuration of the DIIS 110 may have provided that fifteen variables, spread across the data stored in the sensors database 170, the business applications database 171 and the big data database 172, will be used to generate the desired insight. If the logic engine 133 received less than the fifteen variables, than the sufficiency of the insight will be less than 100 percent. As an illustrative embodiment, if the logic engine received twelve of the fifteen variables, because three sensors in the storage tanks were unable to supply data, than the sufficiency of the insight would be less than 100 percent. The sufficiency may be a percentage of the variables desired and the variables actually received (e.g., twelve of fifteen being 80 percent), which assumes each variable is weighted evenly. Alternatively, the variables may be weighted differently, such that the presence or lack of a first variable may impact the sufficiency calculation more than a second variable.

The confidence generated by the sufficiency and confidence generator 132 is an analysis of the curve fitting of the intelligences used to generate the insight. The sufficiency and confidence generator 132 may take into account the method used to approximate the intelligences to one or more curves (e.g., through interpolation or through smoothing), wherein a first method of approximating a curve ("curve fitting") is given a first weight and a second method of curve fitting is given a second weight. In addition, the sufficiency and confidence generator 132 may also take into account the standard deviation of one or more variables from the curve. Therefore, the sufficiency and confidence generator 132 may generate a confidence of the insight based on, at least, the method of curve fitting used and the standard deviation of one or more variables from the curve.

The sufficiency and confidence values are then combined to form a numerical value that is transmitted to the logic engine 133. The sufficiency may be given a first weight and the confidence may be given a second weight such that the numerical value does not necessarily represent an equal weighting of the two. The numerical value representing the sufficiency and confidence is one factor used by the logic engine 133 to determine whether the insight engine should transmit the generated insight to the users 180 and/or the intuition engine 112.

Along with the numerical value representing the sufficiency and confidence of the generated insight, the logic engine 133 also considers the difference between the generated insight and the most recently transmitted insight (i.e., the prior insight transmitted to the users 180 and/or the intuition engine). Similar to the function of the threshold algorithm modules as discussed above, the logic engine 133 determines whether a significant change exists between the generated insight and the most recently transmitted insight. If a significant change does not exist, the insight engine 130 does not transmit the newly generated insight. If a significant change is determined to exist, the insight engine 130 transmits the newly generated insight to the intuition engine 112. Whether a significant change exists is configured during the initial configuration of the DIIS 100.

B. DIIS DATABASES

As illustrated in FIG. 2, the DIIS 100 includes a sensor database 120, a business applications database 121, a big data database 122, a logic engine database 123, a big data query database 124 and an intuition database 125. The sensor database 120, the business applications database 121 and the big data database 122 store intelligences received from the sensor intelligence module 140, the business applications intelligence module 150 and the big data intelligence module 160, respectively. The logic engine database 123, as discussed above, stores generated insights.

The big data query database 124 and the intuition database 125 will discussed below in accordance with the intuition engine 110.

C. INTUITION ENGINE

FIG. 2 also illustrates that the intuition engine 110 includes an intuition logic engine 112, an intuition generator 111 and a query generator 115. The intuition engine 110, and particularly the intuition logic engine 112, is communicatively coupled to the insight engine 130. In addition, the intuition logic engine is communicatively coupled to the intuition generator 111 and the query generator 115. The intuition logic engine 112 includes a cognition engine 114 and a neighborhood event modeler 113.

One purpose of the intuition engine 110 is to provide alternatives to the insight 190 when met with one or more disruptive events that significantly impact the insight 190 limiting its usefulness. The insight engine 130 provides an insight 190 based on data from the sensors database 170, the business applications database 171 and the big data database 172, wherein such data may fit to a mathematical equation (e.g., fit to a curve) within an acceptable standard deviation (e.g., +/−20%) as part of a predictive analysis practice. An acceptable standard deviation for each variable used in the generation of an insight is configured during the initial configuration of the DIIS 100 or through a reconfiguration.

The intuition engine 110 is initially configured with the interest behind the insight inquiry. The interest behind the insight inquiry may be updated via a reconfiguration similar to the reconfiguration of the insight engine and/or one or more of the intelligence modules as discussed above. An intuition 191 is generated by considering the insight 190 in light of one or more disruptive events. In addition, a collection of "neighborhood events" is tracked and an analyzed along with the insight 190 to improve the output given to the user 180. An intuition may be defined as an alternative to the insight 190 that accounts for one or more disruptive events, the alternative having a purpose of improving ability to satisfy the interest behind the insight inquiry. A neighborhood event may be defined as event that impacts the interest behind the insight inquiry; neighborhood events are predefined during the initial configuration of the DIIS and/or during reconfiguration.

The neighborhood event modeler 113 is configured upon the initial configuration of the DIIS 110, or upon reconfiguration, with one or more neighborhood events that correspond to the desired intuition to be generated (a prediction for satisfying the interest behind the insight inquiry). The neighborhood event modeler 113 tracks the one or more neighborhood events and when a disruptive event occurs, analyzes the impact on the state of the interest each neighborhood event has. In addition, the neighborhood event modeler 113 determines whether to reject the insight based on the tracking of the neighborhood events. Through the tracking of the neighborhood events, the neighborhood event modeler 113 determines whether one or more of the neighborhood events have evolved into a situation that should be considered a disruptive event. Whether a neighborhood event should be considered a disruptive event is preconfigured with the initial configuration of the DIN.

For example, the neighborhood event modeler 113 may be tracking the weather near Norman, Okla. as a neighborhood event. The neighborhood event modeler 113 may query the big data query database 124 to determine the weather near Norman, Okla. The query may alert the neighborhood event modeler 113 that a F3 tornado was just sighted 20 miles from Norman, Okla. The neighborhood event modeler 113 may have been previously configured to consider any tornado of at least a F3 on the Fujita Tornado Damage Scale within 50 miles of Norman, Okla. should be considered a disruptive event. In this situation, the neighborhood event modeler 113 would reject a received insight and begin the process to generate an intuition.

The neighborhood event modeler 113 may also communicate with the query generator 115 to query the big data query database 124. The neighborhood event modeler 113 may need big data to perform tracking of one or more neighborhood events. In one exemplary embodiment, a neighborhood event may be the location and traffic situation of one or more transportation vehicles (e.g., a fleet of trucks transporting oil from a tank from to gas stations within a predefined geographic area). In this instance, the neighborhood event modeler 113 may provide information such as, among others, the GPS coordinates of each truck and the one or more destinations of each truck, to the query generator 115. The query generator 115 may then generate a query to the big data query database 124 to determine the traffic on one or more routes between the GPS coordinates and one or more destinations for each truck. The tracking data (e.g., the traffic conditions between each truck and each truck's one or more destination) may be provided to the cognition engine 114 which may select the best route for each truck. The cognition engine 114 may provide its to the intuition generator 111 which may take into account the insight 190 and the selection of the cognition engine 114 to determine that the order in which the shipments are delivered to multiple gas stations should be reordered based on traffic caused by an accident between the GPS coordinates of a first truck and its first location. The determination to reorder the delivery schedule being the intuition 191 and being an improvement over analytic processing that does not take into account disruptive events such as the accident causing traffic.

The interest behind the insight inquiry maybe any event, for example, selling gas to gas stations within a 20 miles radius of Kansas City, Kans. Other examples may be adhering to state and federal safety regulations at all tank farms within a 30 mile radius of Austin, Tex. (a specific geographic region may be desired as factors specific to that geographic region may affect adherence such as temperature).

As an illustrative embodiment, the DIIS 100 may be configured with an insight inquiry of "how much oil and gas should be stored at each distribution facility within 50 miles of the city of Los Angeles?" The DIIS 100 may also be configured with an interest behind the insight inquiry of "maintaining performance on a contract with the city of Los Angeles to deliver 50,000 gallons of oil and gas to the Port of Los Angeles every day." In addition, the DIIS 100 may be configured with three neighborhood events: (1) the weather within 100 miles of Los Angeles, (2) geopolitical unrest in Iraq, (3) traffic routes to the Port of Los Angeles within 100 miles of Los Angeles.

The insight engine 130 may generate an insight 190 that is transmitted to the intuition engine that states the typical 50,000 gallons of oil and gas should be delivered to the Port of Los Angeles at 3:00AM PT using highway 405 Northbound. However, the neighborhood event modeler 113 may observe a large forest fire that is cutting off the transportation route to highway 405. Therefore, the neighborhood event modeler 113 may be configured to flag this as a disruptive event and reject the insight 190.

The neighborhood event modeler 113 will subsequently pass the tracking data of the neighborhood events to the intuition generator 111. The intuition generator 111 will also receives the results of processing in the cognition engine 114 such that transport trucks from a distribution facility north of Los Angeles in order to avoid the fire south of Los Angeles. Therefore, the intuition generator 111 may transmit the intuition 191 to the users 180. Alternative transportation routes may be configured with the initial configuration of the DIIS 100 and stored, for example, the intuition database 125. Similarly, alternative options for each neighborhood event may be stored in the intuition database 125 during a prior configuration (e.g., either initially with the DIIS or during a reconfiguration of the DIIS). The intuition 191 may also be stored in the intuition database 125 for future use by the intuition generator 111 for generation of future intuitions.

Referring to FIG. 3, an exemplary embodiment of a logical representation of the DIIS 100 is shown. The DIIS 100 includes one or more processors 300 that are coupled to communication interface logic 301 via a first transmission medium 320. Communication interface 301 enables communications with intelligence modules (e.g., the sensor intelligence module 140, the business application intelligence module 150 and the big data intelligence module 160) of FIGS. 1A and 1B. According to one embodiment, communication interface 301 may be implemented as a physical interface including one or more ports for wired connectors. Additionally, or in the alternative, communication interface logic 301 may be implemented with one or more radio units for supporting wireless communications with other electronic devices.

The processor(s) 300 is further coupled to the storage 310 via a transmission medium 325. According to one embodiment of the disclosure, the storage 30 may include (a) an insight engine 130, including the mapping editor 131, the logic engine 133, the sufficiency and confidence generator 132, the statistical and predictive analytic engine 134 and the intelligence converters 135; and (b) an intuition engine 110, including an intuition generator 111 and an intuition logic engine 112. Of course, when implemented as hardware, one or more of these logic units could be implemented separately from each other.

Figure 4:
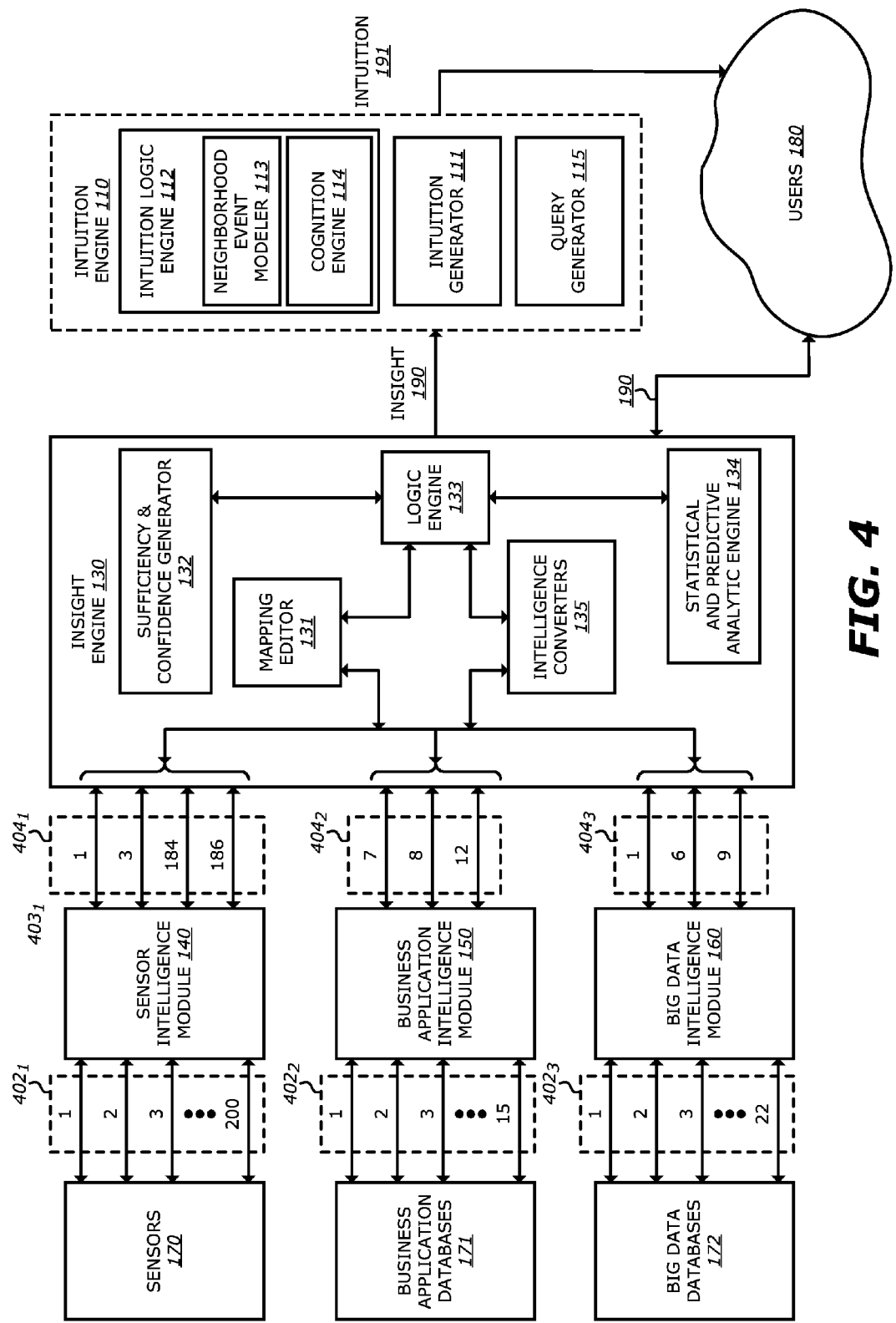
FIG. 4 is a data flow diagram of one embodiment of an insight and an optional intuition output generation process.

Referring to FIG. 4, a data flow diagram of one embodiment of an insight and an optional intuition output generation process is shown. As described in detail in accordance with FIG. 2, the data $402_1$-$402_3$ is transmitted from the sensors database 170, the business applications database 171 and the big data database 172 to the sensor intelligence module 140, the business applications intelligence module 150 and the big data intelligence module 160, respectively.

The sensor intelligence module 140, the business applications intelligence module 150 and the big data intelligence module 160 filter the received data $402_1$-$402_3$ based on instructions received from the mapping editor 131 (and implemented through an initial configuration and/or a reconfiguration process). The filtered data $404_1$-$404_3$ ("intelligences") is subsequently transmitted to the intelligence converters 135 when the intelligence modules determine a significant change exists between the most recently transmitted data and the received data. The intelligence converters 135 aggregate the data and $404_1$-$404_3$ and transmit the aggregated data to the logic engine 133. Subsequently, an insight 190 is generated by the logic engine 133 after processing by the statistical and predictive analysis engine 134 and the sufficiency and confidence generator 132. If the logic engine 133 determines a significant change exists between the newly generated insight 190 and the previous insight most recently transmitted to the users 180 and/or the intuition engine 110, the insight engine 130 transmits the insight 190 to the users 180 and/or the intuition engine 110.

The intuition engine 110 may receive the insight 190 from the insight engine 130 and determine whether to accept or reject the insight 190. If the intuition engine 110 accepts the insight, the neighborhood event modeler 113 of the intuition engine 110 has not determined that a disruptive event exists. However, if the neighborhood event modeler 113, through observation of the tracking and modeling of the neighborhood events, determines that a disruptive event exists, the neighborhood event modeler 113 rejects the insight 190. Upon rejection of the insight 190, the intuition generator 111 receives the tracking and modeling data of the neighborhood event modeler 113, the result of the processing by the cognition engine 114 (e.g., selects an alternative option for the neighborhood event that was flagged as a disruptive event based on preconfigured alternative options, the insight 190 and/or any query results received from the query generator 115). The intuition generator 111 generates and transmits an intuition 191 to the users 180.

Figure 5:
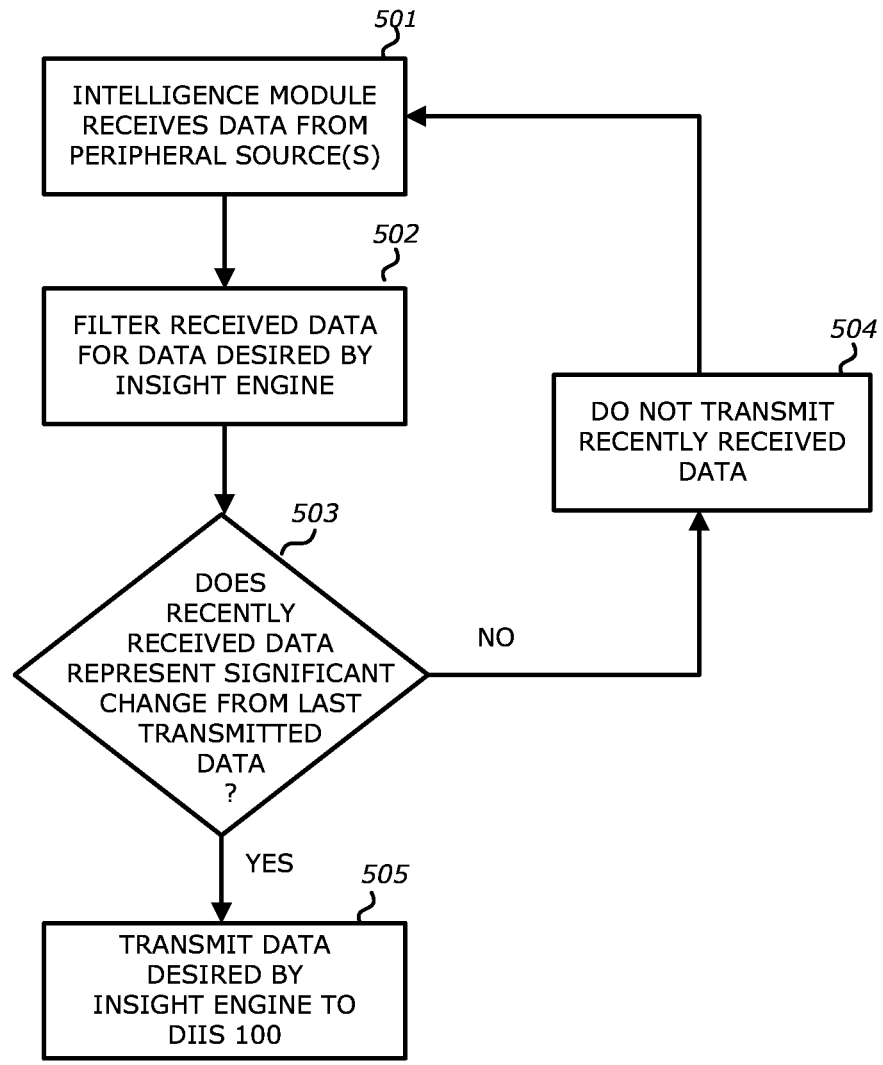
FIG. 5 is a flowchart illustrating an exemplary process for receiving raw data by an intelligence module and transmitting to the DIIS.

Referring to FIG. 5, a flowchart illustrating an exemplary process for receiving raw data by an intelligence module and transmitting to the DIIS is shown. In operation 501, an intelligence module (e.g., the sensor intelligence module 140, the business application intelligence module 150 and the big data intelligence module 160) receives raw data from a peripheral source, for example, a sensor or a database (e.g., the sensors database 170).

In operation 502, the intelligence module filters the received raw data based on instructions received from a mapping editor 131. The instructions allow the intelligence module to filter the raw data for one or more specific portions of the raw data that will be used in generating an insight.

In operation 503, the intelligence module determines whether a significant change exists between the newly received raw data (specifically the one or more specific portions) and the most recently transmitted raw data. If no significant change exists, the one or more specific portions of the recently received raw data are not transmitted (operation 504). However, if a significant change exists, the intelligence modules transmit the one or more specific portions of the recently received raw data to the DIIS 100 (operation 505).

Figure 6:
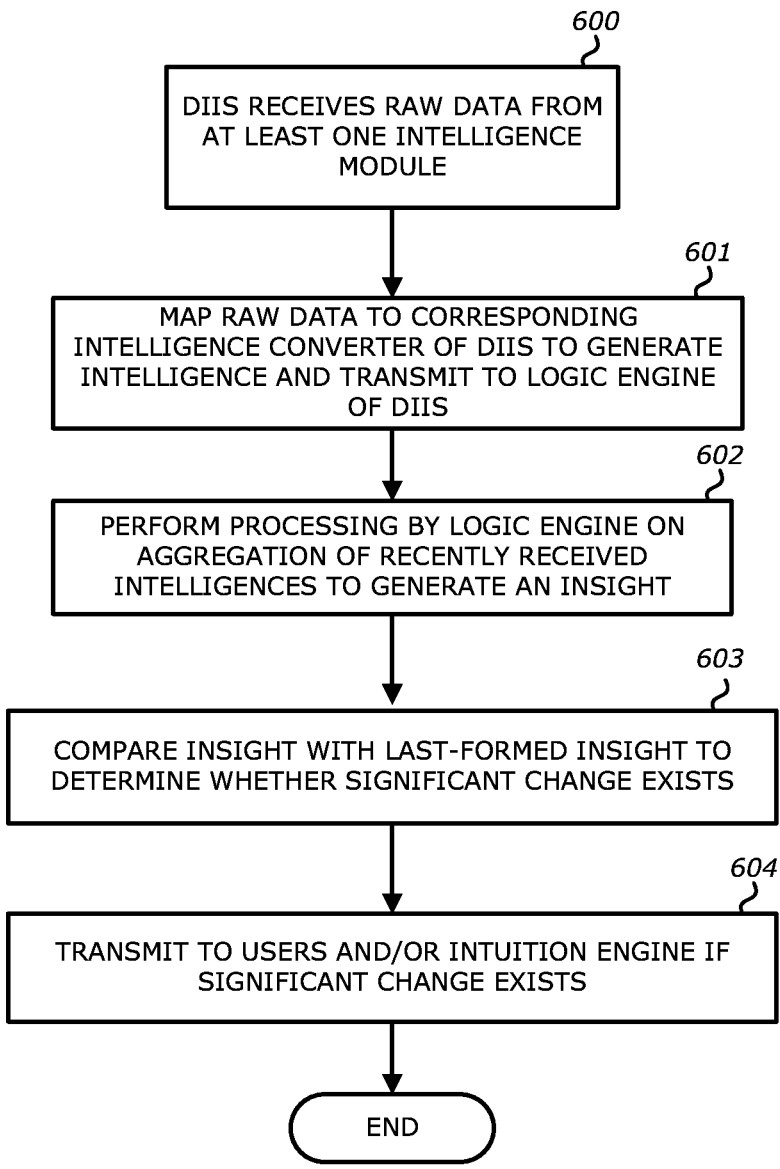
FIG. 6 is a flowchart illustrating an exemplary process for receiving raw data by the DIIS and generating an insight based on the raw data.

Referring to FIG. 6, a flowchart illustrating an exemplary process for receiving raw data by the DIIS 100 and generating an insight based on the raw data. In operation 600, the DIIS 100 receives raw data from at least one intelligence module as discussed in accordance with, among others, FIG. 5.

In operation 601, the raw data is mapped to the corresponding intelligence converter (e.g., the sensor intelligence converter $135_1$, the business applications intelligence converter $135_2$ and the big data intelligence converter $135_3$) and subsequently transmitted to the logic engine 133.

In operation 602, the logic engine 133 processes an aggregation of the last received raw data from each intelligence module to generate an insight. In operation 603, the logic engine compares the newly generated insight with the prior generated insight to determine whether a significant change exists. In operation 604, the newly generated insight is transmitted to one or more users and/or an intuition engine if a significant change exists.

Referring to FIG. 7, a block diagram of the exemplary insight engine 130 is shown. As discussed above, the insight engine 130 is communicatively coupled with databases (e.g., the sensors database 170, the business applications database 171 and the big data database 172) via network, such as the network 240 as shown in FIG. 1A. The insight engine 130 is also communicatively coupled to the logic engine database 123. The insight engine 130 includes the intelligence converters 135 which are illustrated in FIG. 7 as the sensor intelligence converter $135_1$, the business applications intelligence converter $135_2$ and the big data intelligence converter $135_3$. FIG. 7 illustrates the embodiment in which there is a one-to-one ratio between the databases providing raw data to the intelligence converters 135 wherein one intelligence converter $135_{1-3}$ corresponds to one database 170-172. For example, it is illustrated that the business applications database 171 corresponds, and provides raw data to, the business applications intelligence converter $135_2$. In addition, as discussed in detail above, the insight engine 130 may also include the sufficiency and confidence generator 132, the statistical and predictive analytic engine 134 and the logic engine 133.

Figure 8:
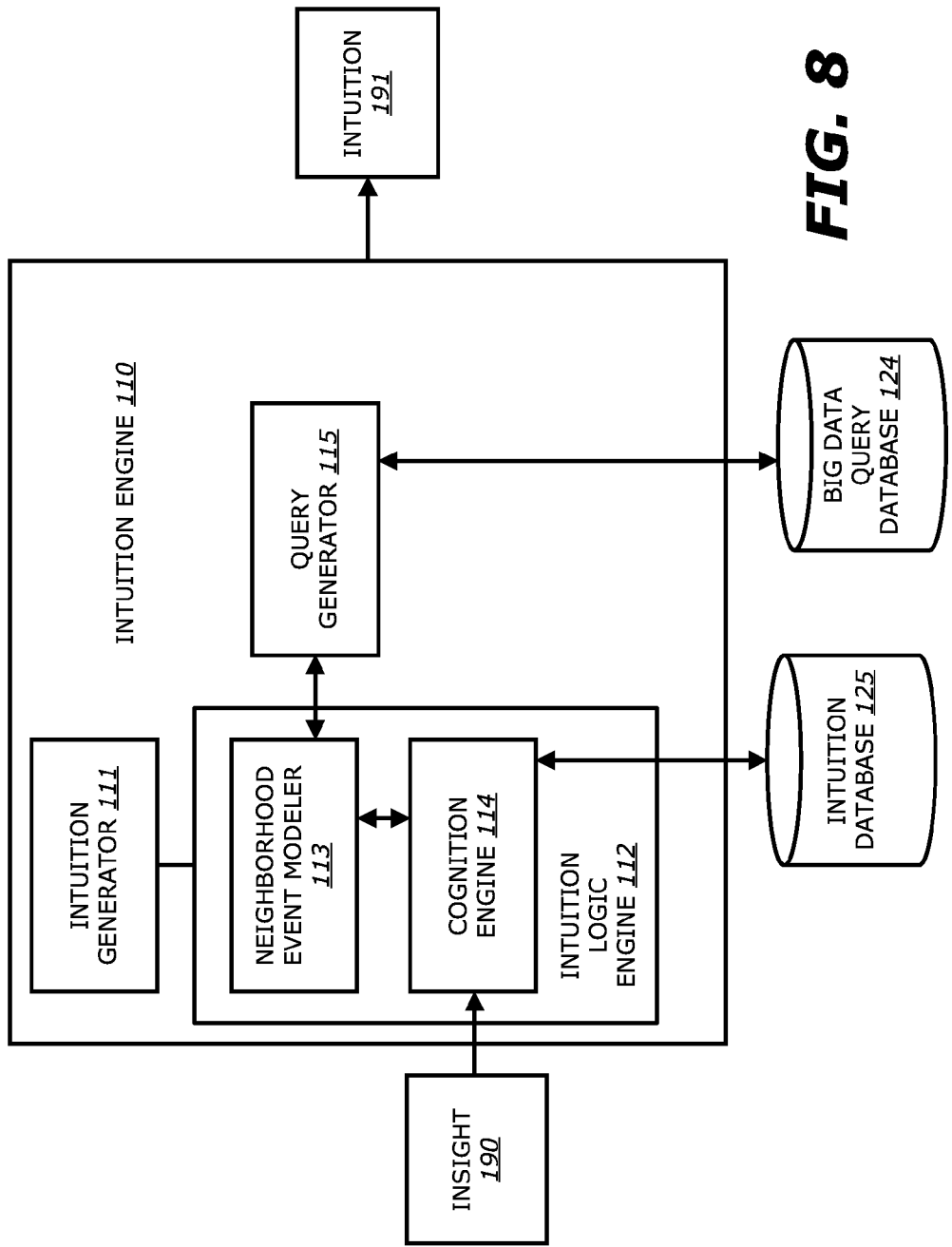
FIG. 8 is a block diagram of an exemplary intuition engine.

Referring to FIG. 8, a block diagram of the exemplary intuition engine 110 is shown. The block diagram illustrates that the intuition engine 110 receives an insight 190 (e.g., from the insight engine 130 as illustrated in FIG. 7) and is communicatively coupled to the intuition database 125 and the big data query database 124. The intuition engine 110 includes an intuition generator 111, a query generator 115 and an intuition logic engine 112 that includes a neighborhood event modeler 113 and a cognition engine 114. As discussed above, the cognition engine 114 communicates with the neighborhood event modeler 113 to receive the tracking data of neighborhood events and performs processing to provide the intuition generator with a selection of an alternative option to the insight 190 that improves the probability of satisfying the interest behind the insight inquiry given the disruptive event. The intuition generator 111 subsequently performs processing based on the tracking and modeling data of the neighborhood event modeler 113, the results of the cognition engine 114 and any query results received from the query generator to generate an intuition 191.

Figure 9:
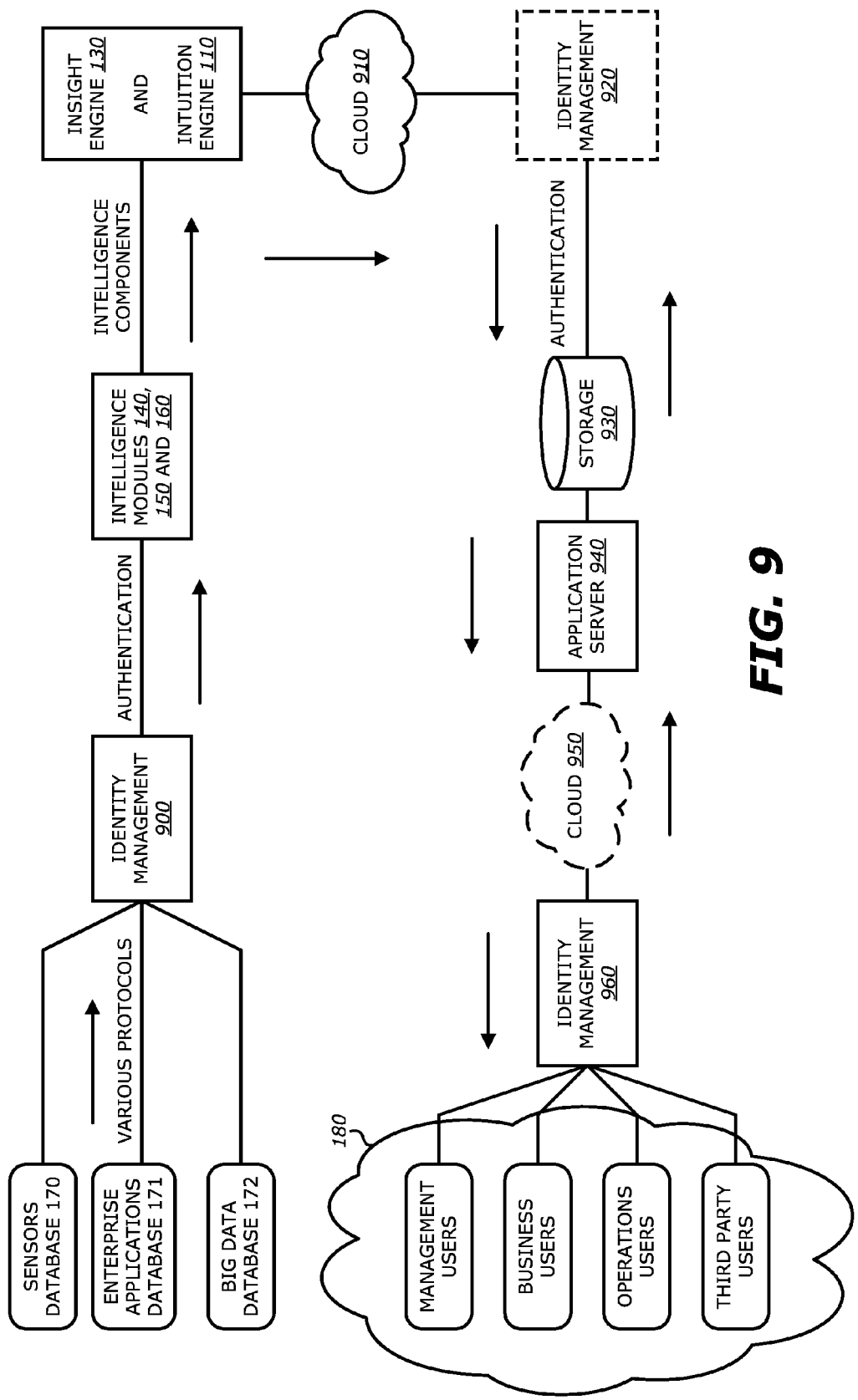
FIG. 9 is a data flow diagram of one embodiment of an authentication process for obtaining an insight and/or an intuition.

Referring to FIG. 9, a data flow diagram of one embodiment of an authentication process for obtaining an insight and/or an intuition is shown. FIG. 9 illustrates that the sensors database 170, the business applications database 171 and the big data database 172 utilize various protocols to communicate with an identity management 900. The identity management 900 authenticates that the databases 170-172 are the actual sources being queried by the intelligence modules 140, 150 and 160. The authentication may take the form of any commonly known authentication process such as verification of a password. A second authentication may take place with the identity management 920 involving the cloud 910. The cloud 910 may be include a public cloud and a private. When the DIIS 100 (e.g., the insight engine 130 and the intuition engine 110) are transmitting data over the network 240 using the cloud 910, authentication may be required if transmitting data from the public portion to the private portion or vice versa.

FIG. 9 also illustrates that the users 180 may be required to authenticate themselves using the identity management 960 prior to storing any data or retrieving any data stored in either the optional cloud 950, the application server 940, the storage 930 or the cloud 910.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims that recite only those features regarded as essential to the invention.

What is claimed is:

1. A system comprising:
a plurality of sensors to measure and collect sensor data regarding equipment, including conditions of the equipment;
a first database to receive, via network communication, and store the sensor data;
a second database to receive and store, via network communication, business enterprise applications data;
one or more processors;
a memory communicatively coupled to the one or more processors and to store logic, the logic, upon being executed by the one or more processors,
receives instructions to filter the sensor data and the business enterprise applications data, for only a specified set of variables,
receives a first set of data from the first and second databases, filters the first set of data for only the specified variables and transmits a first set of the specified variables of the first set of data,
receives a second set of data from the first and second databases, filters the second set of data for only the specified variables to create a second set of specified variables of the second set of data,
determines whether a predetermined change exists between the first set of specified variables of the first set of data and the second set of specified variables of the second set of data, and when a predetermined change exists, transmits the specified variables of the second set of data, wherein determining whether a change exists is based on a comparison of first and second insights generated from the first and second sets of specified variables, respectively, wherein each of the first and second insights are generated with the one or more processor by:
using converters to convert sensor data and business enterprise applications data into intelligence data readable by a logic engine,
performing predictive analytic processing, using the one or more processors, on the intelligence data to generate an individual insight, including determining a logical progression of variables in the intelligence data for the future, the logic engine combining and transmitting the intelligence data and the individual insight.

2. The system of claim 1 further comprising a big data database to store big data, and wherein the individual insight is generated by using another converter to convert the big data to be part of the intelligence data, and wherein the predictive analytic processing is performed on the intelligence data that includes converted big data to generate the individual insight.

3. The system of claim 1 wherein the sensor data is received from the first database at predetermined intervals.

4. The system of claim 1 wherein the predetermined change comprises a definition of predetermined change for each of the specified variables, each definition configured prior to, or included with, the reception of instructions to filter data for only a specified one or more variables.

5. The system of claim 4 wherein a predetermined change exists with respect to a definition of at least one of the specified variables.

6. The system of claim 1 further comprising:
when the predetermined change exists, storing the specified variables of the second set of data in a database corresponding to the logic.

7. A system comprising:
a plurality of sensors to measure and collect sensor data regarding equipment, including conditions of the equipment;
one or more processors;
a memory communicatively coupled to the one or more processors and to store logic, the logic, upon being executed by the one or more processors,
transmits instructions to filter data for only a specified one or more variables,
receives a first set of specified variables corresponding to sensor data in a first external database, upon receiving the first set of specified variables,
accessing a second set of specified variables corresponding to business enterprise applications data in a second external database, accessing a third set of specified variables corresponding to big data in a third external database, and
performing predictive analytic processing using the first set of specified variables, the second set of specified variables and the third set of specified variables, wherein performing predictive analytic processing comprises using the one or more processors to determine a logical progression of variables in first, second and third sets of specified variables for the future to generate a first insight, using converters to convert sensor data and business enterprise applications data into intelligence data readable by a logic engine, determining whether a predetermined change exists between the first insight and a second insight generated before the first insight, and when a predetermined change exists, transmitting the first insight.

8. The system of claim 7, wherein the first insight includes a recommendation based on the results of the predictive analytic processing of the specified variables corresponding to the first external database, the specified variables corresponding to the second external database and the specified variables corresponding to the third external database.

9. The system of claim 7, wherein the logic, upon being executed by the one or more processors, further generates a sufficiency value of the first insight based on analyzing the number of variables used in generating the first insight and the desired number of variables for generating the first insight.

10. The system of claim 9, wherein the logic, upon being executed by the one or more processors, further generates a confidence value of the first insight based on the deviation from an approximating a curve for one or more of the specified variables corresponding to the first external database, specified variables corresponding to the second external database or specified variables corresponding to the third external database.

11. The system of claim 7, wherein the logic, upon being executed by the one or more processors, further determines whether a predetermined change exists between the first insight and the most recently transmitted insight, and when a predetermined change exists, transmitting the first insight.

12. The system of claim 11, wherein the predetermined change comprises a definition of predetermined change for each of the specified variables, each definition configured prior to, or included with, the reception of instructions to filter data for only a specified one or more variables.

13. The system of claim 12, wherein a predetermined change exists with respect to a definition of at least one of the specified variables.

14. A system comprising:
one or more processors;
a memory communicatively coupled to the one or more processors and to store logic, the logic, upon being executed by the one or more processors, receive an insight, the insight being generated with the one or more processor by using converters to convert sensor data and business enterprise applications data into intelligence data readable by a logic engine, performing predictive analytic processing on the intelligence data, including determining a logical progression of variables in the intelligence data for the future, the logic engine combining and transmitting the intelligence data and the individual insight, track and model a plurality of predefined events corresponding to the insight, based on the tracking and modeling of the plurality of predefined events, determine whether a disruptive event exists, and when a disruptive event is determined to exist, generate an intuition based on predetermined alternative options to one or more of the plurality of predefined events.

15. The system of claim 14, wherein the insight is received from an insight engine.

16. The system of claim 14, wherein the disruptive event corresponds to a predetermined state of at least one of the plurality of predefined events.

17. The system of claim 14, wherein the logic, upon being executed by the one or more processors, further comprises:

generate a query based on one or more predefined events of the plurality of predefined events, and query a database using the generated query to receive data for the tracking and modeling corresponding to the one or more predefined events of the plurality of predefined events used in generating the query.

18. The system of claim 14, wherein the intuition is stored in a database included in the system for use in generation of subsequent intuitions.

19. The system of claim 14, wherein the logic, upon being executed by the one or more processors, further comprises:

performing an authentication process on a received request to access one or more of the insight or the intuition.

20. The system of claim 14, wherein the logic, upon being executed by the one or more processors, further comprises:

storing the intuition on a cloud storage service that requires completion of an authentication process prior to accessing at least one of the insight or intuition.

* * * * *